United States Patent [19]
Smets et al.
[11] Patent Number: 4,492,016
[45] Date of Patent: Jan. 8, 1985

[54] PALLET ASSEMBLY APPARATUS AND METHOD

[75] Inventors: John E. Smets; John S. Smets; Robert D. Smets, all of Lake Oswego; Barry K. Massinger, Portland, all of Oreg.

[73] Assignee: Smetco, Inc., Portland, Oreg.

[21] Appl. No.: 418,611

[22] Filed: Sep. 16, 1982

[51] Int. Cl.³ .............................................. B23P 11/00
[52] U.S. Cl. ..................................... 29/432; 29/281.4; 29/281.5; 29/784; 29/798; 29/799; 227/152
[58] Field of Search .................... 29/281.4, 281.5, 432, 29/798, 784, 799; 227/152

[56] References Cited

U.S. PATENT DOCUMENTS

| | | | |
|---|---|---|---|
| 3,512,242 | 5/1970 | Harvis | 29/252 |
| 3,844,466 | 10/1974 | Narita et al. | 227/152 X |
| 3,941,291 | 3/1976 | Hayworth | 227/152 |
| 3,968,560 | 7/1976 | Vail | 227/152 X |
| 4,077,106 | 3/1978 | Lichtenstein et al. | 227/152 X |
| 4,168,566 | 9/1976 | Streckert | 29/432 |
| 4,235,005 | 11/1980 | James | 227/152 X |
| 4,373,651 | 2/1983 | Fanslow | 29/432 X |
| 4,403,388 | 9/1983 | Belcher | 29/798 X |

FOREIGN PATENT DOCUMENTS 31759 7/1981 European Pat. Off. ............ 227/152

OTHER PUBLICATIONS

"Palletron Pallet Fabricating Systems", brochure published by Palletron, (Schiller Park, Illinois).
"The Pallet Digest", brochure published by Anderson Publications, (Tulare, California).
"The New Nailing System: The Carousel", brochure published by LAP Industries, (Placentia, California).
"Belcher", brochure published by John L. Johnson & Associates, (Portland, Oregon).

*Primary Examiner*—Charlie T. Moon
*Assistant Examiner*—Ronald S. Wallace
*Attorney, Agent, or Firm*—Klarquist, Sparkman, Campbell, Leigh & Whinston

[57] ABSTRACT

An apparatus is provided for assembling pallets which includes an assembly table which is pivotable on an axis, supports for supporting a plurality of first deck boards, and a displaceable support for holding up the underside of the pallet when the table has been inverted, the displaceable support being displaceable to an out of the way position to permit the pallet to drop from the table when assembly has been completed.

18 Claims, 7 Drawing Figures

LAY IN TOP BOARDS AND STRINGERS, CLAMP, LAY IN AND NAIL BOTTOM BOARDS

NAIL TOP BOARDS

RELEASE PALLET ONTO INCLINED RUNWAYS

PALLET ASSEMBLY APPARATUS AND METHOD

BACKGROUND OF THE INVENTION

1. Field of the Invention

This invention relates generally to pallet assembly operations and more particularly to an apparatus and method which utilizes a pivotable table for fabrication of pallets.

2. Discussion of the Prior Art

Pallets used for the storing and shipment of goods typically have a top and bottom deck with at least two so-called stringers extending therebetween. Such pallets have been used for many years to permit the handling of loads with fork trucks having forks which extend between the two decks of the pallet. The pallet decks are constructed of wooden boards, with the stringers extending in a direction normal to the boards. Various systems have been developed for assembling pallets without requiring a high degree of skill or substantial expenditure of time by the laborer.

The earliest such systems consisted of simple jigs designed to facilitate alignment of the deck boards and stringers during assembly. While jigs are helpful in reducing the amount of skill required to assemble a pallet, it was still quite time consuming to fabricate pallets in this fashion.

In an attempt to reduce the labor costs associated with pallet assembly, various attempts have been made to develop automatic machines for assembling pallets. One such machine is disclosed in U.S. Pat. No. 3,968,560 to Vial. Another automated system is being marketed by John L. Johnson & Associates of Portland, Oregon, under the BELCHER trademark. While the use of these automated systems will naturally have a tendency to reduce labor costs, they are expensive, thereby requiring a long period of effective use before any financial savings are appreciated.

Because of the expense of fully automated pallet assembly systems, there has been a major effort in developing a pallet assembly apparatus which permits more efficient assembly of pallets than is possible with a simple jig, yet which does not involve the expense of a fully automated system. One such attempt is disclosed in U.S. Pat. No. 4,235,005 to James. This patent covers a pallet assembly apparatus having a rotatable table which permits both the top and bottom deck boards to be fastened to the stringers without requiring the pallet to be removed from the table until fully assembled.

While James' apparatus eliminates some of the labor involved in the use of a simple jig, it normally requires two persons to use it, with one standing on each side of the assembly table. There are other drawbacks in the design of the James apparatus. For example, the pallet stringers are held in the table during assembly by pads which compress the stringers endwise by the action of a pair of pneumatic cylinders. This requires constant compression which must be sufficient to hold the stringers adequately but should not be so great as to damage the apparatus components or the stringers. Another drawback with James' apparatus is that it has a substantial number of parts, many of which are by necessity adjustable to permit the apparatus to assemble pallets of different dimensions. It is also desirable with the James apparatus to have a so-called pattern pallet to permit accurate adjustment. The method of using the James apparatus has the drawback of including two separate nailing operations, separated by an intermediate assembly step in which additional boards are mounted in place. This can be inconvenient to the laborers because nailing is typically performed by pneumatic guns, which must be put down for the intermediate assembly step.

Hence, it is a primary object of the present invention to provide an improved apparatus and method for assembling pallets which effectively and reliably overcome the aforementioned drawbacks and limitations of the prior art proposals. More specifically, the present invention has as its objects:

(1) To develop a pallet assembly apparatus which is usable by a single laborer having a minimal amount of skill and training;

(2) The provision of a pallet assembly apparatus which permits the assembly of pallets at a high rate of speed, yet which is relatively simple in design and is therefore inexpensive and easily maintained;

(3) To provide an apparatus for assembling pallets of varying sizes and number of boards and which is easily adjusted to assemble such different types of pallets and which is particularly suited to be easily adjusted to assemble a few different standard sized pallets;

(4) The development of a system for holding pallet components in a pallet assembly table during assembly, which securely holds the components, yet which requires a minimum amount of holding force; and (5) To provide a method of assembling pallets which does not require the use of expensive, high technology equipment.

SUMMARY OF THE INVENTION

This invention responds to the problems presented in the prior art by providing an apparatus for assembling pallets which includes the following components: (1) an assembly table which is pivotal on an axis; (2) means mounted to the table for supporting a plurality of first deck boards; (3) means mounted to the table for supporting a plurality of stringers placed over the first deck boards; (4) means mounted to the table for supporting a plurality of second deck boards placed over the stringers; (5) displaceable support means mounted to the table for holding up the underside of the pallet when the table has been inverted, the displaceable support means being displaceable to an out of the way position to permit the pallet to drop from the table when assembly has been completed. Normally, the first deck boards comprise the top deck boards of the pallet, and the second deck boards are the bottom deck boards, with the top and bottom deck boards being substantially parallel to the axis of pivot of the assembly table.

The invention also provides a method for assembling pallets, which includes the following steps: (1) aligning a plurality of first deck boards on a pivotal assembly table; (2) placing stringers over and substantially normal to the first deck boards; (3) clamping the stringers in position against the first deck boards with a plurality of aligned, displaceable bracket means; (4) mounting a plurality of second deck boards in engagement with the displaceable bracket means to align the second deck boards over the stringers; (5) fastening the second deck boards to the stringers; (6) pivoting the table to expose the first deck boards for fastening to the stringers; (7) fastening the first deck boards to the stringers; and (8) displacing the bracket means to release the assembled pallet.

The invention thus provides a pallet assembly system which is usable by a single worker having a minimum of skill, yet which is relatively simple in construction but versatile to permit accommodation of pallets of various sizes and board spacing.

BRIEF DESCRIPTION OF THE DRAWINGS

The invention will be better understood, and objects and advantages other than those set forth above will become apparent when consideration is given to the following detailed description thereof. Such description makes reference to the annexed drawings wherein.

DETAILED DESCRIPTION OF THE PREFERRED EMBODIMENT

Figure 1:
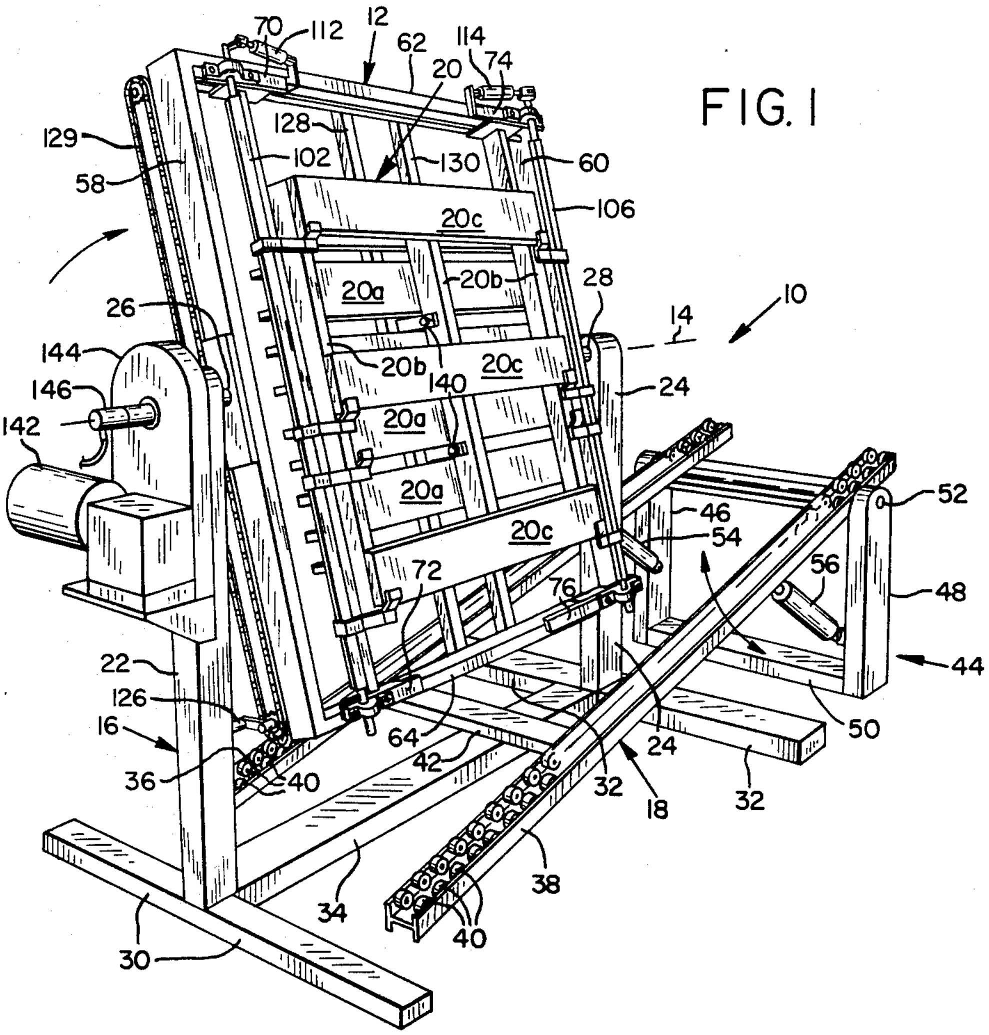
FIG. 1 is a perspective view of an embodiment of the present invention showing a fully assembled pallet thereon prior to the removal of the pallet from the table.

The principles of this invention are particularly useful when embodied in a pallet assembly apparatus such as that illustrated in FIGS. 1-4, generally identified with the numberal 10. The apparatus 10 is comprised essentially of an assembly table 12 which is mounted to rotate about a substantially horizontal axis 14 while supported by a base 16. A pivotal ramp 18 is also provided, which is adapted to convey assembled pallets 20 away from the assembly table.

The base 16 includes a pair of upwardly extending support columns 22 and 24, each of which rotatably engages a table support shaft 26 or 28, respectively, using appropriate bearings (not shown). The base 16 typically includes widely extending feet 30 and 32 with a centrally disposed stiffening member 34 extending therebetween.

The Ramp

Referring to FIG. 1, the ramp 18 includes a pair of parallel runways 36 and 38 having free wheeling rollers 40 thereon. A cross member 42 is provided for structural support. The ramp runways 36 and 38 are pivotally mounted to a ramp base 44 comprised of a pair of upwardly extending ramp support columns 46 and 48 with a single supporting foot 50 extending therebetween at their lower ends. Supporting foot 50 is typically mounted to a larger support standard, which has not been depicted for purposes of simplification. The means for pivoting the runways 36 and 38 with respect to the ramp base 44 is provided by a shaft 52 which is rotatably mounted adjacent the upper ends of the ramp support columns 46 and 48. A pair of hydraulic cylinders 54 and 56 extend between the central portions of the ramp support columns 46 and 48 and the ramp runways 36 and 38 to control the pivoting of the runways about the shaft 52 to thereby determine the inclination thereof. Conventional means (not shown) are provided for controlling the operation of the hydraulic cylinders 54 and 56.

The Assembly Table

Figure 3:
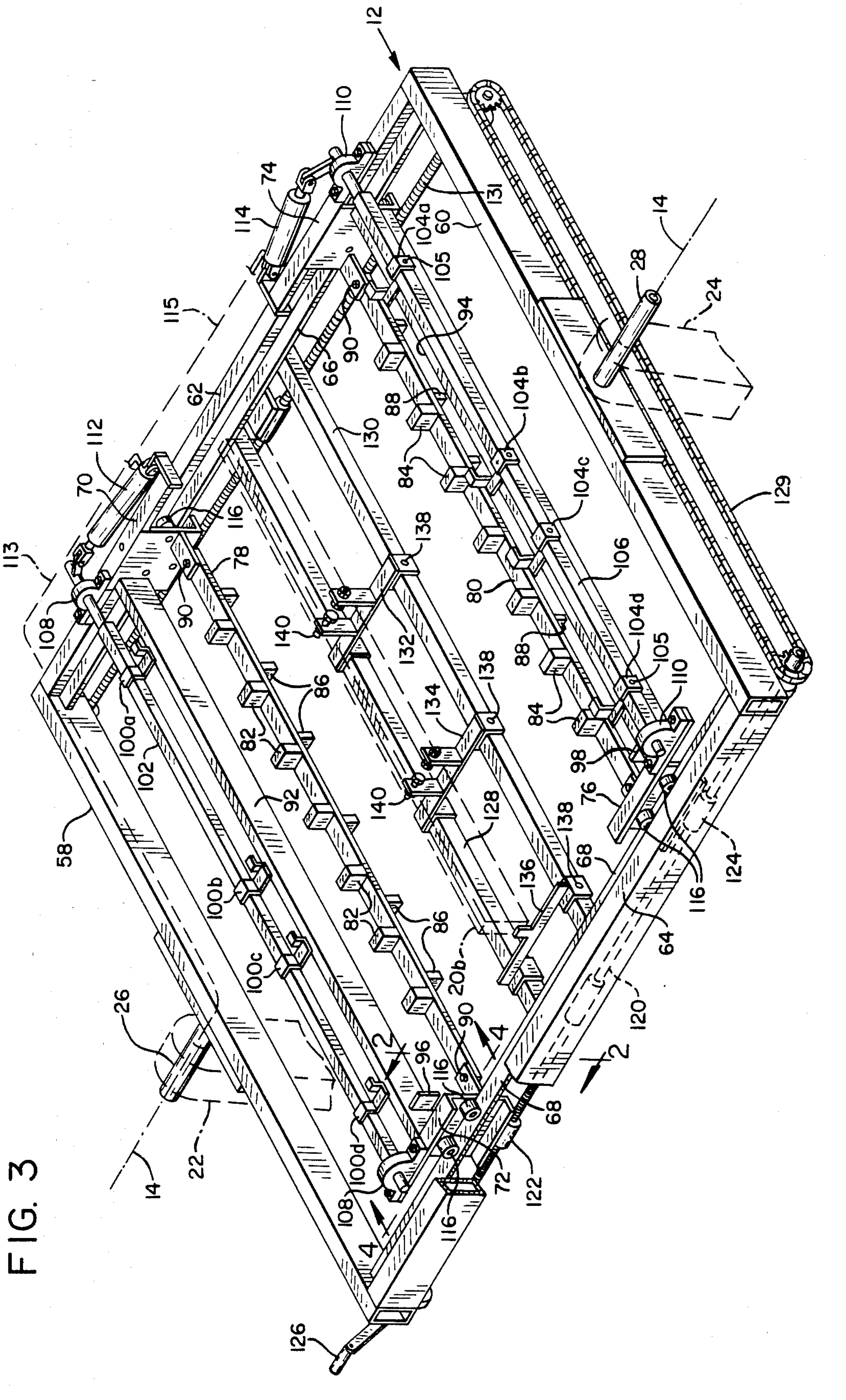
FIG. 3 is a perspective view of the assembly table included in the embodiment of FIG. 1, showing pivotal support members in a lowered position.

The assembly table 12, best depicted in FIG. 3, is rectangular in configuration with its periphery defined by four channel members 58, 60, 62, and 64. The channel members 62 and 64, which extend in a direction parallel to the axis of rotation 14, each includes an inwardly extending, linear track 66 or 68 which cooperate to guide two pair of adjustment carriages 70, 72, 74, and 76. As will be explained in detail below, the adjustment carriages 70, 72, 74, and 76 are provided to facilitate the assembly of pallets of different dimensions.

The assembly table 12 is provided with means for supporting the boards of the first deck of the pallet 20. The first deck normally is the top deck, comprised of top deck boards **20*a*. The stringers have been designated 20*b* and the second or bottom deck boards 20*c*. In the depicted apparatus, means for supporting the first deck comprises a pair of top deck board guide bars 78 and 80 which extend between the adjustment carriages 70 and 72, and 74 and 76, respectively, in a direction perpendicular to the axis 14 of rotation. A plurality of evenly spaced ribs 82 and 84 extend upwardly from the guide bars 78 and 80, respectively, with the assembly table 12 in the position depicted in FIGS. 2 and 3. Additional ribs 86 and 88 extend downwardly from the guide bars 78 and 80, respectively, the ribs 86 and 88 being offset with respect to the ribs 82 and 84 so that by inverting the guide bars, a different top deck board spacing will be provided. The guide bars 78 and 80 are removably mounted to the adjustment carriages 70, 72, 74, and 76 such as by bolts 90** to facilitate inversion of the guide bars.

In an alternate embodiment (not shown) the ribs are displaceable along the top deck board guide bars to adopt the guide bars to receive deck boards in a wide variety of spacing without necessitating that the operator keep extra guide bars on hand. However, this embodiment is more complicated than that depicted, so is not the preferred mode of practicing the invention.

Stringer alignment members 92 and 94 extend between the adjustment carriages 70 and 72, and 74 and 76, respectively, to facilitate alignment of the stringers **20*b*. A stringer abutment plate 96 and 98 extends from each of the stringer alignment members 92 and 94 to provide an abutment for one end of each of the two outer pallet stringers, and for the first top deck board. In some applications it may be desirable that the stringer abutment plates be displaceable along the stringer alignment members to permit the pallet to be centered with respect to the table 12. However, such displaceabitlity has not been depicted because it is not normally a necessary feature. The stringer abutment plates 96 and 98** will sometimes be referred to herein as stringer support means.

A plurality of spaced, displaceable support means are provided for holding up the underside of the pallet 20 when the table 12 has been inverted, as will be explained in detail below. In the depicted embodiment, the support means comprise four pivotal brackets **100*a*, 100*b*, 100*c*, and 100*d* mounted to a pivotal shaft 102 extending between bearings 108 mounted to the adjustment carriages 70 and 72, and pivotal brackets 104***a*, 104*b*, 104*c*, and 104*d* mounted to a pivotal shaft 106 extending between bearings 110 mounted to the adjustment carriages 74 and 76. The pivotal brackets 100*a–d* and 104*a–d* are adjustably secured onto the pivotal shafts 102 and 106 by set screws 105 which, if loosened, permit the brackets to be slid into different positions to accommodate different spacings of bottom deck boards 20*c*.

Figure 2:
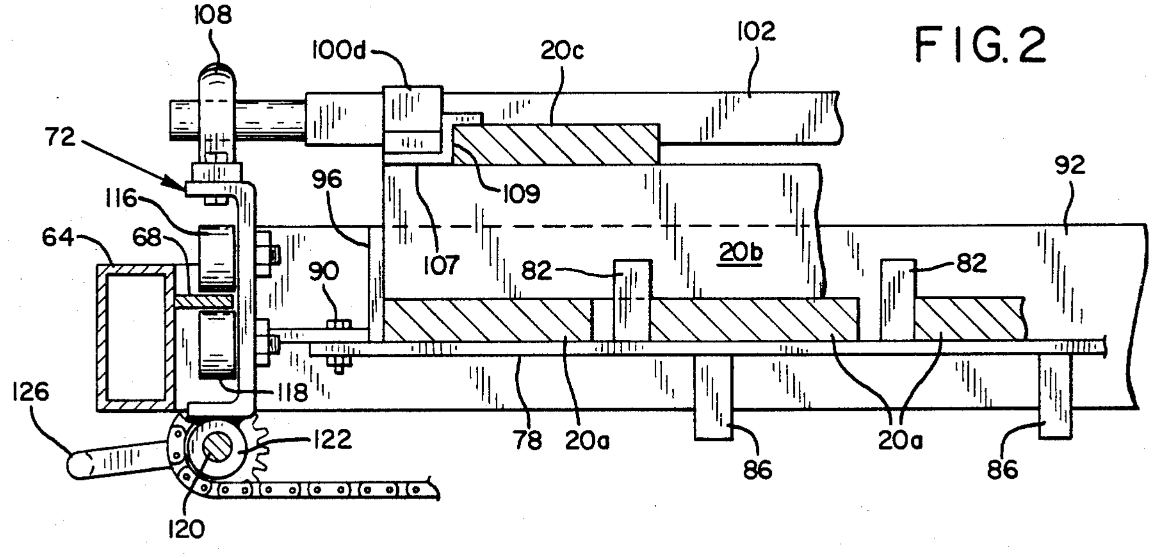
FIG. 2 is an enlarged, fragmentary sectional view taken along line 2—2 of FIG. 3.

As best seen in FIG. 2, the pivotal brackets 100*a–d* and 104*a–d* are substantially "Z" shaped in cross section, each having a stringer support surface 107 for holding up the stringers 20*b* when the table 12 is inverted, and an upper deck board support surface 109 perpendicular to the stringer support surface, for supporting the upper deck boards as will be described in detail below. A pneumatically driven pivotal shaft displacement cylinder 112 is mounted to the adjustment carriage 70 to control the pivoting of the pivotal shaft 102. A corresponding pivotal shaft displacement cylinder 114 is also mounted to the adjustment carriage 74 to control the pivoting of pivotal shaft 106. Air for the displacement cylinders 112 and 114 is provided through air conduits 113 and 115, respectively.

It is best seen in FIG. 3 that the pivotal shafts 102 and 106 are disposed outwardly and upwardly from the top deck plate guide bars 78 and 80. The term "outwardly" as used herein means toward the channel members 58 and 60 or 62 and 64. The pivotal shafts 102 and 106 are disposed outwardly of the guide bars to simplify placement of the top deck boards 20*a* and are disposed upwardly to accommodate for the thickness of the pallet 20.

The adjustment carriages 70, 72, 74, and 76 are displaceble toward and away from each other (inwardly and outwardly) along the channel members 62 and 64, as best shown in FIGS. 2 and 3. A pair of rollers 116 extends from each adjustment carriage over the track 66 or 68, with a third roller 118 extending from the adjustment carriage to a point immediately under the track.

A threaded carriage adjustment shaft 120 is provided immediately below the adjustment carriages 72 and 76 which are mounted to the adjustment shaft by threaded sleeves 122 and 124. One half of the carriage adjustment shaft 120 is left-hand threaded, with the other half being right-hand threaded so that rotation of the shaft such as by a removable handle 126 will result in adjustment carriages 70 and 72 moving in opposite directions from adjustment carriages 74 and 76. A pair of adjustment shaft drive chains 129 are provided to convey the rotation of the carriage adjustment shaft 120 to a second carriage adjustment shaft 131 provided below channel member 62. The second carriage adjustment shaft 131 controls the displacement of the adjustment carriages 70 and 74 in the same fashion as the displacement of the adjustment carriages 72 and 76 is controlled, to prevent any jamming or misalignment which might occur if only a single carriage adjustment shaft was provided. The handle 126 is normally removable because adjustment of carriages 70, 72, 74, and 76 will only be necessary when initially readying the assembly table 12 for the assembly of pallets of a particular size.

A pair of centrally disposed stringer support arms 128 and 130 with stringer support brackets 132 and 134 extending therebetween extend across the assembly table 12 between the channel members 62 and 64 to provide support to the central pallet stringer. A stringer abutment bracket 136 extends between the stringer support arms 123 and 130 against which the central stringer is adapted to abut. The stringer support brackets 132 and 134 and the stringer abutment bracket 136 are affixed to the stringer support arms 128 and 130 by set screws 138 which permit them to be displaced along the stringer support arms in the event adjustment is desired. The stringer support brackets 132 and 134 are provided with stringer holding bolts 140 which are adjustable to facilitate the holding of stringers of varying thicknesses and with a varying amount of gripping pressure. The central stringer 20*b* is thus maintained in position by the stringer abutment bracket 136 and the stringer support brackets 132 and 134 while it is being supported from below by the top deck boards 20*a*.

Drive means is provided for rotatably driving the assembly table 12. In the depicted embodiment the drive means rotates the assembly table in a clockwise direction with the apparatus in the position shown in FIG. 1. The drive means includes a drive motor 142 which is drivingly connected to the table support shaft 26 by appropriate gearing disposed within a gear housing 144. Control means such as foot or hand levers (not shown) are provided to give the operator complete control of the rotation of the assembly table 12. An air brake (not shown) is built into the drive means so that the assembly table is firmly held in position when it is not being rotated.

Because the rotation of the assembly table 12 is normally in a single direction, the table support shaft 26 is rotatably mounted to a coupling 146, which directs control air through the center of the table support shaft 26. Air conduits 113 and 115 then direct the air through the channel members 58 and 62 to the pivotal shaft displacement cylinders 112 and 114. The coupling 146 is of conventional design and preferably is Dueblin Union Model 12-025-041.

Operation of the Depicted Embodiment

Figure 5:
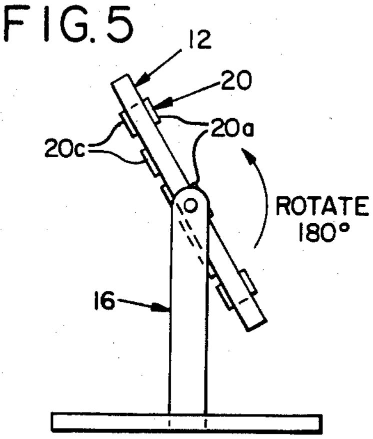
FIG. 5 is a simplified schematic view depicting the first steps involved in assembling a pallet utilizing the embodiment depicted in FIGS. 1-4.

To operate the pallet assembly apparatus 10, the runways 36 and 38 of the ramp 18 are shifted to the downwardly inclined position depicted in FIG. 1. The assembly table 12 is then rotated to an angle approximating that depicted in FIG. 5; i.e., at an oblique angle facing the operator while being somewhat upwardly facing. The position may be more upright than depicted as long as the table is not leaning forwardly toward the operator.

If necessary, before initiating assembly of the pallet, the assembly table 12 is adjusted to the appropriate size and deck board positioning. To accommodate for various widths of pallets, handle 126 may be used to rotate the carriage adjustment shaft 120 which causes adjustment carriages 70 and 72 to move toward or away from adjustment carriages 74 and 76. The movement of the adjustment carriages cause top deck board guide bars 78 and 80, stringer alignment members 92 and 94, and pivotal shafts 102 and 106 to also be displaced. The top deck guide bars 78 and 80 may be inverted if necessary or replaced with guide bars having different board spacings. The pivotal brackets 100*a–d* and 104*a–d* may be adjusted along pivotal shafts 102 and 106 if necessary through the use of set screws 105 to provide for appropriate spacing of the bottom deck boards. As shown in FIG. 1, the depicted assembly table 12 is prepared to receive three evenly spaced bottom deck boards 20*c*; so pivotal brackets 100*c* and 104*c* are not being used.

Figure 4:
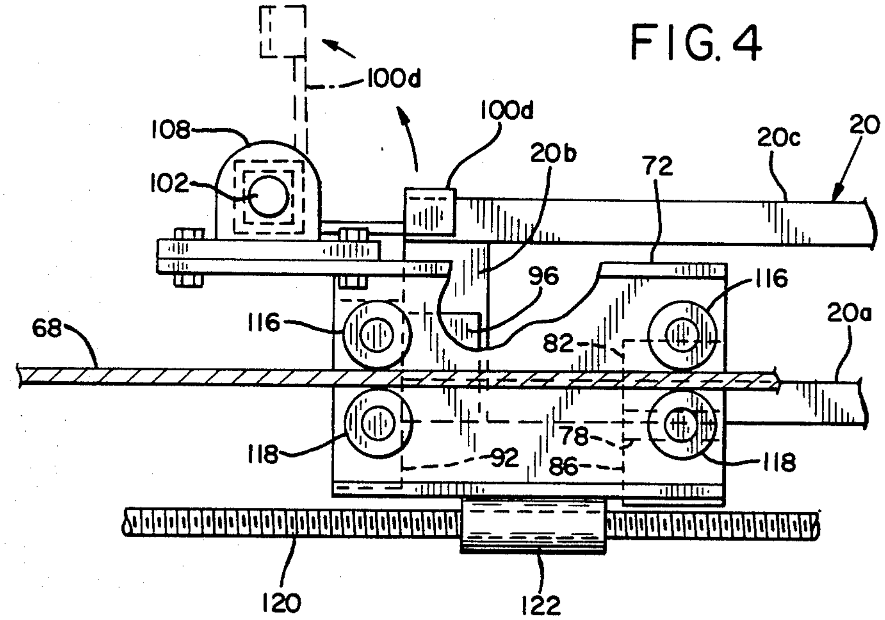
FIG. 4 is a fragmentary sectional view taken along line 4—4 of FIG. 3, except that the pivotal support members are shown in their raised position.

When initiating pallet assembly, pivotal brackets 100*a–d* and 104*a–d* should be in the raised position as shown in FIG. 4. The top deck boards 20*a* are then placed on the top deck board guide bars 78 and 80 between the ribs 82 and 84. The three pallet stringers 20b are then placed over the top deck boards 20a, with the outer stringers being disposed adjacent the stringer alignment members 92 and 94 in abutment with the stringer abutment plates 96 and 98, while the central stringer is fit between the stringer holding bolts 140 in the stringer support brackets 132 and 134 with its end resting against the stringer abutment bracket 136.

With the stringers 20b in position, the pivotal shafts 102 and 106 are pivoted, causing the pivotal brackets 100a–d and 104a–d to pivot downwardly so that the stringer support surface 107 of each of the pivotal brackets contacts the upper surface of the outer stringers. This securely holds the outer stringers in position against the top deck boards 20a. With the pivotal brackets 100a–d and 104a–d in this lowered position, as depicted in FIGS. 1–3, the bottom deck boards 20c may be put in place in engagement with the pivotal brackets, being supported in horizontal alignment by the upper deck board support surfaces 109 of each of the pivotal brackets. A11 of the boards of the pallet 20 are then in position, ready for fastening.

Figure 6:
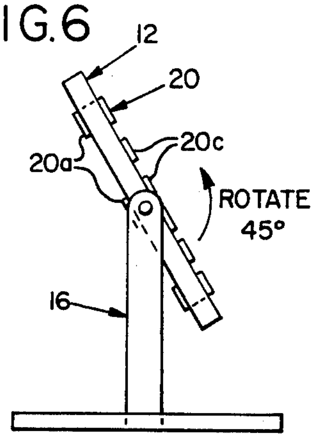
FIG. 6 is simplified schematic view showing the next steps involved in assembling a pallet utilizing the embodiment depicted in FIGS. 1-4.

To fasten the boards, the bottom deck boards 20c are first nailed to the stringers 20b. The assembly table 12 is then rotated 180° to the position schematically represented in FIG. 6, with the top deck boards 20a in a slightly upwardly facing disposition for nailing. With the assembly table 12 in this inverted position, the pivotal brackets 100a-d and 104a-d hold up the underside of the partially assembled pallet to prevent it from dropping from the assembly table. The top deck boards 20a are then nailed into the stringers 20b. The assembly table 12 is then rotated somewhat more than 45° to the position depicted in FIG. 7, with the table in a substantially horizontal position with the bottom deck boards 20c of the assembled pallet 20 facing downwardly.

Figure 7:
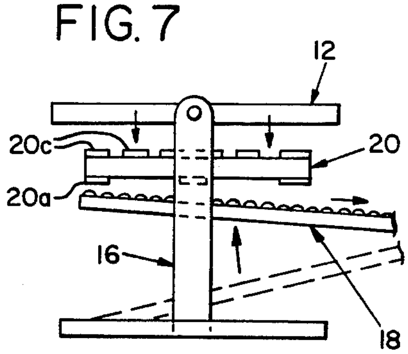
FIG. 7 is a simplified schematic view showing the final step involved in assembling a pallet utilizing the embodiment depicted in FIGS. 1-4.

The hydraulic cylinders 54 and 56 are then extended to elevate the free end of the runways 36 and 38, as depicted in FIG. 7. The pivotal shafts 102 and 106 are then actuated to open the pivotal brackets 100a–d and 104a–d, i.e., to displace them to their out of the way position, to release the assembled pallet, thereby permitting it to drop out of the assembly table 12 and onto the rollers 40 on the runways 36 and 38. The assembled pallet then rolls downwardly away from the assembly table 12 and toward an appropriate pallet stacker (not shown).

The hydraulic cylinders 54 and 56 are retracted to lower the runways 36 and 38, and the assembly table 12 is rotated somewhat less than 45° to the position depicted in FIG. 1, again ready to receive the pallet boards and stringers 20a, b and c.

Of course, it should be understood that various changes and modifications of the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

We claim:

1. An apparatus for assembling pallets comprising:
an assembly table pivotable on an axis;
means mounted to said table for supporting a plurality of first deck boards in a first common plane which is initially inclined upwardly;
means mounted to said table for supporting a plurality of stringers placed loosely and abuttingly retained over the first deck boards;
means mounted to said table for supporting a plurality of second deck boards placed in a second common plane over the loosely held stringers and first deck boards; whereby said second deck boards are fastened to said stringers, said table is pivoted on said axis to invert said table, and said first deck boards are fastened to said stringers.

2. The apparatus of claim 1 wherein said axis is substantially horizontal and wherein said means for supporting the first deck boards supports the first deck boards so as to position the first deck boards in a direction substantially parallel to said axis.

3. An apparatus for assembling pallets comprising:
an assembly table pivotable on an axis;
means mounted to said table for supporting a plurality of first deck boards;
means mounted to said table for supporting a plurality of stringers placed over the first deck boards;
means mounted to said table for supporting a plurality of second deck boards placed over the stringers;
displaceable support means mounted to said table for holding up the underside of the pallet when said table has been inverted, said displaceable support means being displaceable to an out of the way position to permit the pallet to drop from said table when the assembly has been completed; and
said means for supporting the second deck boards and said displaceable support means comprising bracket means pivotally mounted to said table to selectively hold up and then release the inverted, assembled pallet.

4. The apparatus of claim 3 wherein said bracket means comprise a plurality of pivotal brackets, each of which is mounted to a rotationally pivotal shaft.

5. The apparatus of claim 4 wherein said pivotal shaft is disposed outwardly of said means for supporting the first deck boards.

6. The apparatus of claim 4 wherein said pivotal brackets each includes a stringer support surface for holding up a stringer when said table is in an inverted position, and a second deck board support surface perpendicular to said stringer support surface, said second deck board support surface holding up a second deck board before attachment of the second deck board to the stringers.

7. The apparatus of claim 4, further comprising means for displacing said pivotal shafts toward and away from each other to accommodate deck boards of varying lengths.

8. The apparatus of claim 7, wherein said displacing means comprise two pairs of aligned carriages mounted to said sides of said table, one of said bars and pivotal shafts being mounted to each pair of carriages, and wherein said pairs of carriages are displaceable along said table sides.

9. The apparatus of claim 8, further comprising pivotable ramp means disposed below said table for receiving an assembled pallet therefrom.

10. An apparatus for assembling pallets comprising:
an assembly table pivotable on an axis;
means mounted to said table for supporting a plurality of first deck boards;
means mounted to said table for supporting a plurality of stringers placed over the first deck boards;

means mounted to said table for supporting a plurality of second deck boards placed over the stringers;

displaceable support means mounted to said table for holding up the underside of the pallet when said table has been inverted, said displaceable support means being displaceable to an out of the way position to permit the pallet to drop from said table when assembly has been completed; and said means for supporting the first deck boards comprising a pair of parallel, spaced, ribbed bars extending between opposite sides of said table.

11. The apparatus of claim 10 wherein said bars include ribs of different spacing on each side, and said bars are invertible to assemble pallets of different first deck board spacing.

12. An apparatus for assembling pallets comprising:

an assembly table rotatable on a substantially horizontal axis;

means mounted to said table for supporting a plurality of first deck boards; and pivotal support means pivotally mounted to said table for holding up the underside of the pallet when said table has been inverted, said pivotal support means being pivotal to an out of the way position to permit the pallet to drop from said table when assembly has been completed.

13. A method for assembling pallets, comprising the following steps in the order recited:

aligning a plurality of first deck boards on a pivotable assembly table;

placing stringers over and substantially normal to the first deck boards;

clamping the stringers in position against the first deck boards with a plurality of aligned, displaceable bracket means;

mounting a plurality of second deck boards in engagement with the bracket means to align the second deck boards over the stringers;

fastening the second deck boards to the stringers;

pivoting the table to expose the first deck boards for fastening to the stringers;

fastening the first deck boards to the stringers; and displacing the bracket means to release the assembled pallet.

14. The method of claim 13 wherein said step of aligning the first deck boards involves aligning the first deck boards substantially parallel to the axis of pivot of the table.

15. The method of claim 13, further comprising the initial step of positioning the assembly table at an oblique angle facing an operator while being somewhat upwardly facing, wherein the step of pivoting the table comprises pivoting the table approximately 180 degrees, and wherein the table is pivoted to a substantially horizontal disposition after the first deck boards are fastened.

16. A method for assembling pallets comprising the following steps in the order recited:

supporting plural first deck boards parallel to one another in a common plane;

placing stringers over and substantially normal to the first deck boards;

holding the stringers and first deck boards together in a non-fastened abutting relationship;

placing plural second deck boards parallel to one another and over the stringers, the second deck boards being substantially normal to the stringers;

fastening the second deck boards to the stringers;

turning over the combination of the first deck boards, stringers and fastened second deck boards to expose the first deck boards; and fastening the first deck boards to the stringers.

17. A method according to claim 16 in which the common plane is at an oblique angle so as to position the first deck boards somewhat upwardly tilting.

18. A method according to claim 17 wherein the step of turning over the combination comprises the step of pivoting the combination through approximately 180 degrees.

* * * * *